United States Patent [19]
Kamada

[11] 3,798,634
[45] Mar. 19, 1974

[54] METHOD AND APPARATUS FOR DETECTING AND REPRESENTING IN BINARY FORM DIGITAL INDICATION OF MEASURING INSTRUMENT FOR RECORDING

[75] Inventor: Takeshi Kamada, Yokohama, Japan
[73] Assignee: Ricoh Co. Ltd., Tokyo, Japan
[22] Filed: Nov. 24, 1970
[21] Appl. No.: 92,357

[30] Foreign Application Priority Data
Nov. 24, 1969 Japan.............................. 44-93579
Dec. 24, 1969 Japan............................ 44-103425
May 25, 1970 Japan............................... 45-44010

[52] U.S. Cl. ........................ 340/347 P, 235/92 EA
[51] Int. Cl............................................. G08c 9/08
[58] Field of Search.... 340/347; 235/92 EA, 92 BD, 235/61 PD

[56] References Cited
UNITED STATES PATENTS
| | | | |
|---|---|---|---|
| 3,497,138 | 2/1970 | Fisher............................ | 235/61 PD |
| 2,318,591 | 5/1943 | Couffignal..................... | 235/92 EA |
| 3,275,807 | 9/1966 | Harper.......................... | 235/92 BD |
| 3,238,524 | 3/1966 | Oddo et al..................... | 340/347 P |

OTHER PUBLICATIONS
A. K. Susskind, "Notes on Analog–Digital Conversion Techniques," pp. 3–18 to 3–21, 1957.

Primary Examiner—Charles D. Miller
Attorney, Agent, or Firm—Cooper, Dunham, Clark, Griffin & Moran

[57] ABSTRACT

The invention provides an electric system and apparatus for generating the electrical signals representing in binary code a digital indication of a measuring instrument such as a gas meter, etc. Apparatus comprises coding means such as pins or permanent magnets arrayed in rows and columns around the periphery of each digit disk of a counter in the measuring instrument so as to represent in binary code the decimals, for example, from 0 to 9 positioned around the periphery of each disk: detecting means such as electric contacts or relays actuable by the pins or reed switches actuable by the permanent magnets, disposed along the detecting line at which the pins or permanent magnets represent in binary form the indication of the measuring instrument; and terminals electrically connected to the coding and detecting means so as to derive the electrical signals from the apparatus. Detecting means are selectively closed or opened depending upon the presence or absence of coding means, in the detecting position, representing the indication in binary form so that the electrical signals representative of the presence or absence of the coding means appear at the terminals. That is, electrical signals representing in binary code the indication of the measuring instrument are generated. Automatic recording of the indication or data of the instrument may be possible without involving any human error and these data recorded on a tape may be directly fed to a data processing system such as card-punches. The apparatus may be used also as a coding apparatus for use in on-line telemetering systems. The visual display of the indication is also possible by marking the decimals around the periphery of each digit wheel.

4 Claims, 24 Drawing Figures

| ROWS<br>COLUMN | 0 | 1 | 2 | 3 | 4 | 5 | 6 | 7 | 8 | 9 |
|---|---|---|---|---|---|---|---|---|---|---|
| a |   | ○ |   |   | ○ | ○ |   |   | ○ |   |
| b | ○ | ○ | ○ |   |   |   |   |   |   |   |
| c |   |   | ○ | ○ | ○ |   |   |   |   |   |

FIG. 10

| ROWS / COLUMN | 0 | 1 | 2 | 3 | 4 | 5 | 6 | 7 | 8 | 9 |
|---|---|---|---|---|---|---|---|---|---|---|
| a |  | O |  |  | O | O |  |  | O |  |
| b | O | O | O |  |  |  |  |  |  |  |
| c |  |  | O | O | O |  |  |  |  |  |
| a' | O |  |  | O |  |  | O |  |  | O |
| b' |  |  |  |  |  | O | O | O |  |  |
| c' |  |  |  |  |  |  |  | O | O | O |

METHOD AND APPARATUS FOR DETECTING AND REPRESENTING IN BINARY FORM DIGITAL INDICATION OF MEASURING INSTRUMENT FOR RECORDING

BACKGROUND OF THE INVENTION

The present invention relates to generally a measuring instrument of the type for numerically expressing the magnitude of a given variable, for example, time, gas, water or electricity used or sold, and more particularly a method and apparatus for generating the electrical signals representing in binary form an indication or reading of a counter incorporated in a measuring instrument of the type described. The present invention may be applicable to a coding apparatus for use for example in telemetering systems.

In the engineering fields, it is very often required to generate the electrical signals representing in binary code an indication or reading of the magnitude of a given variable expressed numerically or digitally by a counter in a measuring instrument or meter for visual reading, so that the electrical signals may be fed directly into a suitable data processing system. Such measuring instruments or meters as described are not limited to the use in factories for process control or the like. For example a great number of meters are used in the residential areas in order to measure a quantity of water, gas or electricity sold. In general, an inspector must read and record the indication or reading of every meter in his assigned area. For example, a quantity of water, gas or electricity sold for a predetermined time interval is obtained by substracting the previous indication recorded on a log or the like from the present indication as indicated. Such manual reading and recording tend to result in errors, consume considerable time and are slow and tedious. Furthermore, thus manually recorded data cannot be directly fed into a data processing equipment so that punched cards or the like must be prepared, resulting in errors and considerable time consumption again. To overcome these problems the use of a telemetering system has been proposed so that an indication of every meter distributed in a very large area may be electrically transmitted through, for example, telephone lines to a computation center of a gas, water or electricity company. This system would afford much time and labor saving and recording without any error because the indication as indicated by the counter may be directly fed into a data processing system.

To realize this system, the electrical signals representing an indication as indicated by a counter in a measuring intrument or meter must be generated. That is, a coding apparatus must be incorporated in every instrument or meter. However, the prior art coding apparatus which are exclusively designed for use in factories, etc. are, in general, prohibitably expensive and complex for the system of the type described.

SUMMARY OF THE INVENTION

In general, the present invention provides a method for detecting and generating the electrical signals in binary code representing an indication or reading as indicated by a counter of a measuring instrument of the type for digitally expressing said indication. The decimal digits positioned around the circumference of each digit wheel in the counter are represented in the combinations of coding means such as pins, permanent magnets, etc. which are arrayed in rows and columns around the circumference of each digit wheel. In the present specification, the term rows imply equiangularly spaced apart lines on the circumference of a digit wheel in the direction of its thickness. Thus for the representation of the decimal digits from 0 to 9 the circumference has ten equiangularly spaced apart lines or rows in the direction of thickness of a digit wheel. The term columns imply the lines equidistantly spaced apart from each other around the circumference of the digit wheel at right angles relative to the rows. Therefore, a particular combination of presence and absence of coding means such as pins, permanent magnets, etc. in each column in one row may represent a decimal digit positioned around the circumference of the digit wheel. In consequence, an indication or reading of the counter may be represented in binary form, that is the presence and absence of coding means. The indication or reading in binary form by the coding means upon the digit wheels in the counter in a predetermined angular position is detected and then converted into the electrical signals in binary code representing this indication, the electrical signals being fed into a recorder for example.

According to the present invention, a serial number or the like of a measuring instrument may be also represented by the electrical signals so as to be recorded together with those representing the indication, whereby the data processing may be much facilitated.

The present invention provides an apparatus for generating the electrical signas in binary code representing an indication as indicated by a counter in a measuring instrument of the type described. The apparatus of the type described may include means for generating the electrical signals representing a serial number or the like of the instrument.

According to one aspect of the present invention, the coding means comprises a plurality of projections or pins extending from the circumference of each digit wheel in a counter so as to represent the digits positioned around the circumference of the digit wheel. These projections or pins may be electrically connected to a common terminal, which in turn may be connected to an electric power source to be described hereinafter. Means such as a movable arm is provided for detecting the presence and absence of coding means in each column in one row which is rotated to a predetermined angular position so as to indicate the reading of the instrument. Upon energization of for example an electromagnet the movable arms are attracted toward the digit wheels so that when there are pins, the movable arms which are electrically connected to individual terminals make contact with the pins, thereby completing the circuits. But when there are no pins, they do not make contact with each other so that no electrical circuit is completed. In this manner, the electrical signals representing in binary form the presence and absence of the pins and thus the reading of the instrument may be generated and recorded into a recorder.

According to another aspect of the present invention, instead of pins which function as one electric contacts coacting with the others, that is the movable arms, the permanent magnets may be embedded in the circumference of a digit wheel in a similar manner as described hereinabove so as to represent the decimal digits positioned around the digit wheel. And instead of the movable arms, the reed switches may be used which are actuable by the permanent magnets. Thus, the reed switches are closed in the presence of the magnets while they remain opened in the absence of them, so that the electrical signals representing in binary code an indication or reading of an measuring instrument may be generated in a similar manner. This arrangement is advantageous in that no mechanical contact is used so that the service life of the apparatus may be remarkably improved and in that the apparatus may become quite simple in construction.

According to another aspect of the present invention, instead of representing a decimal digit by the presence and absence of coding means in each column on one row, the combinations of presence and absence of coding means in at least two angularly spaced apart rows are used. This arrangement is particularly advantageous in that a number of columns may be reduced while a large number of binary digits may become available so that the parity check bits may be employed to avoid errors. This arrangement is also advantageous in that the thickness of a digit wheel may be reduced or at least remains same even through a number of binary digits to be used in increased at least twice.

For recording thus generated electrical signals, a data collector incorporating therein an electric power source and recorder is generally used. That is, the apparatus in accordance with the present invention may be activated only when it is electrically connected to the power source of the data collector. More particularly, the apparatus functions as other instruments representing their readings through the counters and only when the data collector is connected, an indication or reading as indicated may be represented in the electrical signals and recorded. However, it will be understood that the use of the apparatus is not limited to this recording method and that the on-line telemetering system utilizing the telephone lines or the like may be feasible at such a low cost and in such a simple manner hitherto unobtainable. It is seen that the visual reading of an instrument is possible at any time as the case of the conventional one.

The recorded indications and serial numbers or the like of the measuring instruments may be directly fed into a suitable data processing equipment such as card punches so that the present invention affords not only the considerable labor and time savings, but also the recording without any human error.

It is therefore the primary object of the present invention to provide a method and apparatus for generating the electrical signals representing in binary code an indication or reading as indicated and a serial number or the like of a measuring instrument of the type numerically or digitally expressing the magnitude of a given variable for example gas, water or electricity sold.

The apparatus of the present invention may be applicable to an coding apparatus for use in telemetering systems.

The apparatus in accordance with the present invention is simple in construction, compact in size, reliable in operation and considerably inexpensive to manufacture. The present invention may be readily applicable to the conventional measuring instruments in a very simple manner.

The present invention will become more apparent from the following description of the illustrative embodiments thereof taken in conjunction with the accompanying drawing.

BRIEF DESCRIPTION OF THE DRAWING

Same parts are designated by same reference numerals throughout the figures.

DESCRIPTION OF THE PREFERRED EMBODIMENTS

First Embodiment, FIGS. 1 – 4

The first embodiment is an explane of the present invention applied to a watt-hour meter or the like installed in each house or the like so as to generate the electrical signals representing an indication as indicated by the meter when a data collector to be described in more detail hereinafter is coupled thereto for recording.

Figure 1:
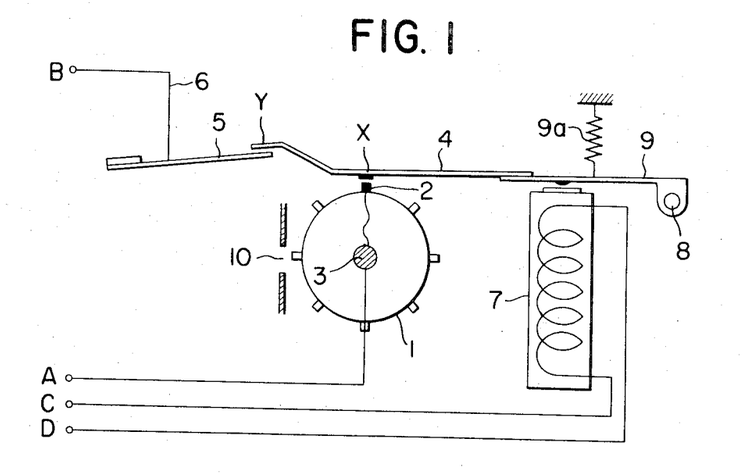
FIG. 1 is a diagrammatic side view of a first embodiment of the present invention.

Referring to FIG. 1, a digit wheel 1 having pins 2 arrayed in row and column is rotatably carried by a shaft 3. In the first embodiment, the pins 2 constitute electric contacts which are electrically connected to an external common terminal A through the shaft 3 and lead wires. A movable arm 4 is securely fixed to a supporting member 9 which in turn is pivotably fixed by pivots 8 to a suitable stationary member (not shown) of the meter and is biased by a spring 9a. The movable arm 4 has an electric contact X which makes contact with the pin 2 and another electric contact Y at the free end thereof which makes contact with a stationary arm 5 securely fixed to a stationary member of the meter and electrically connected to an individual terminal B through a lead wire 6.

An electromagnet 7 disposed below the movable arm 4 is to be energized when a pair of terminals C and D of the coil of the electromagnet 7 are coupled to an electric power source of the data collector to be described hereinafter. When energized, the electromagnet 7 attracts the supporting member 9 downwardly so that the movable arm 4 is caused to move downwardly, thereby making the contacts X and Y contact with the pin 2 upon the digit wheel 1 and with the stationary arm 5.

Figure 2:
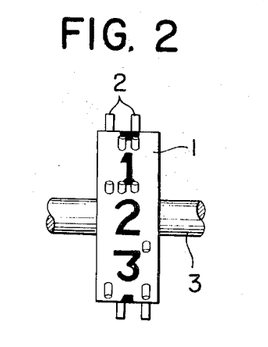
FIG. 2 is a front view of a digit wheel thereof.
Figure 3:
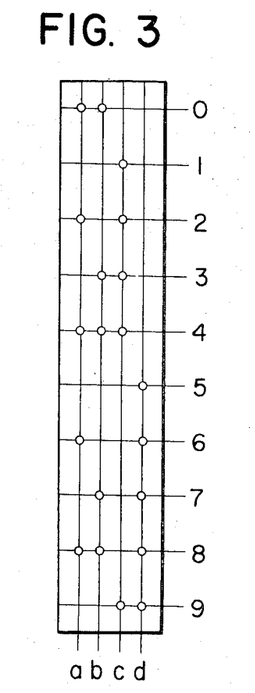
FIG. 3 is for explanation of a binary code system used in the present invention in order to represent in binary form the decimals positioned around the periphery of the digit wheel in a counter of a meter.

The counter, that is the digit wheels 1 will not be described in detail in this specification because it will not constitute the present invention. Referring to FIG. 2, the pins 2 extendeding from the periphery of the digit wheel 1 represent the digit 0 to 9 in binary code as shown in FIG. 3, where the white dots represent the pins 2. Any other suitable binary code may be employed and any other suitable projection may be utilized instead of the pins 2. It is seen that the two pins at the top of the digit wheel 1 in FIG. 2 represent the digit 2.

Figure 4:
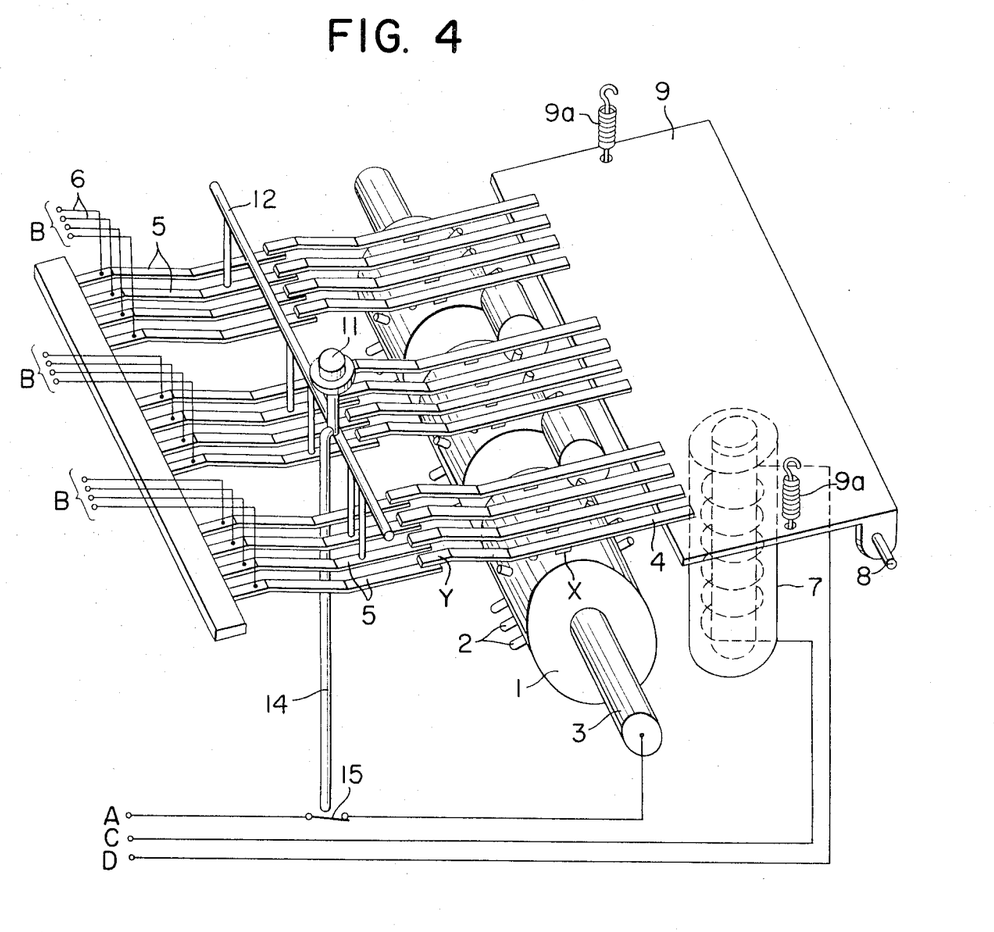
FIG. 4 is a perspective view of the first embodiment of FIG. 1 for generating the electrical signals representing in binary code an indication in three digits.

Referring to FIG.4 in order to generate the electrical signals representing an indication as indicated by the counter in three digits, four movable arms 4, four stationary arms 5 and four individual terminals B must be provided for four columns a, b, c and d on the periphery of each digit wheel 1. Therefore, the meter must be provided with 12 movable arms 4, 12 stationary arms 5, 12 individual terminals B, and one supporting members 9 which is normally biased upwardly by the springs 9a and is moved downwardly when the electromagnet 7 is energized.

Next the mode of operation of the first embodiment will be described. First, the terminals A, B, C and D are connected to their corresponding terminals on the side of a data collector (not shown) incorporating therein an electric power source and recorder. The terminals C and D are connected to the terminals of the power source while the terminals A and B are connected to those of the recorder. Upon depression of a pushbutton of the power source in the data collector, the electromagnet 7 is energized so that the movable arms 4 are moved downwardly in the manner described hereinabove so that the contacts X make contact with the pins 2 when they are present.

In consequence, the circuits between the terminals A and B are completed so that "ON" or "1" signals may be derived from the terminals B. When there is no pin, the movable contact X makes no contact with the pin 2, so that the circuit between the terminals A and B and including this movable bar remains opened. Thus, an OFF or 0 signal is derived from the associated terminal B. Now the electrical signals representing, in binary code, the indication of the meter are generated and recorded into the recorder of the data collector. The recorded signals may be processed in a manner well known in the art of the data processing system. From the foregoing, it will be seen that the indication of the magnitude of a variable of the meter may be recorded in a simple manner without any mistake compared with the manual reading and recording.

Referring back to FIG. 2, the decimals from 0 to 9 may be marked upon the circumference of the digit wheel 1 in addition to the pins 2 in order to permit the visual reading of the indication of the meter or the like device. As has been discussed a row of pins 2 representing, in binary code, a decimal is angularly spaced apart from this decimal through for example 90° as shown in FIG. 2. That is, a decimal being displayed through a window 10 is represented in binary form by the row of pins 2 now making contact with the movable contacts X of the movable arms 4.

Figure 5:
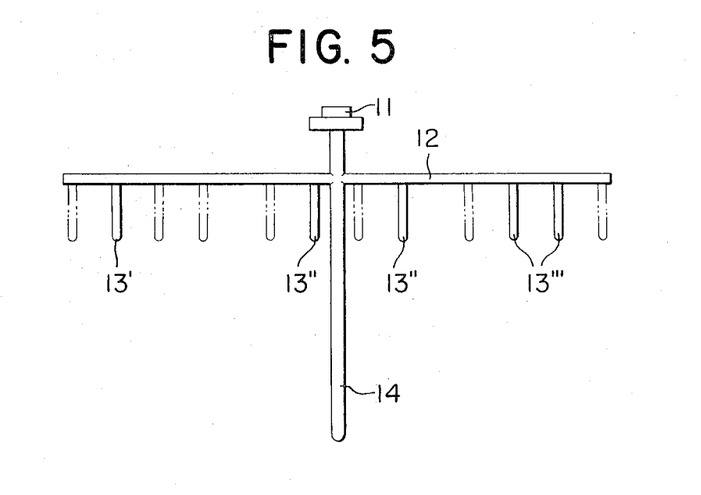
FIG. 5 is a front view of a pushbutton-like switch for generating the electrical signals representing in binary code a serial number or the like of the measuring instrument, the apparatus incorporating this switch constituting the second embodiment in this specification.
Figure 6:
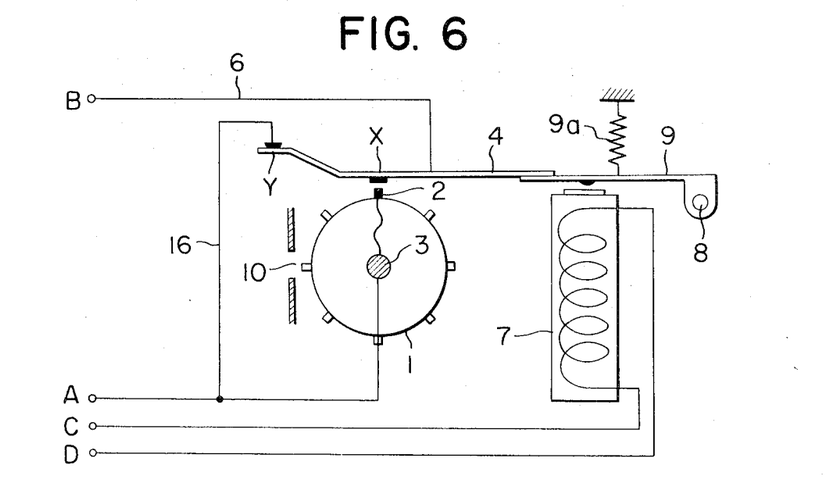
FIGS. 6 and 7 are diagrammatic views illustrating a third embodiment of the present invention.

Second Embodiment, FIGS. 4 and 5

When the indication of the meter or the like device is recorded in the form of binary coded electrical signals, it is often desired to record also a code or serial number of the meter so that the recorded data may be readily identified. The second embodiment is capable of recording this serial number or the like of the meter or the like device.

Referring to FIG. 4, a pushbutton-like switch 11 is provided. As shown in FIG. 5, the switch 11 is generally in the form of a cross. From a transverse beam or rod 12 are downwardly extended pins 13 which are so arranged as to represent a serial number or the like of the meter in binary code, for example, in accordance with the code system as shown in FIG. 3. In FIG. 5, the four pins 13 at the left are for representing the hundreds of a three-digit serial number or the like; the four pins at the center, the tens; and the four pins at the right, the units. In the instant embodiment, the pin 13' represents the decimal 1; the pins 13" represent the decimal 2; and the pin 13'" represents the decimal 3. Thus, the switch 11 represents the decimal number 123 in binary code. The pins indicated by the chain lines are not provided. They are for better understanding of the arrangement of the pins 13. As shown in FIG. 5, an upright rod 14 serves to open a normally closed switch 15 when the switch 11 is depressed.

Next the mode of operation will be described. Upon depression of the switch 11, the pins 13', 13" and 13'" make contact with the associated stationary arms 5 while the upright rod 14 opens the normally closed switch 15 so that the digit wheels are electrically disconnected from the terminal A. Now the circuits are completed between the terminals A and B through the upright and transverse rods 14 and 13, the pins 13', 13" and 13'", their associated stationary arms 5 and the leads 6. The ON signals are derived from the closed circuits while OFF signals are derived from the circuits which remain opened. Thus, it is seen that the electrical signals representing in binary code the serial number 123 of the meter is generated and recorded into the recorder of the data collector. This recording of the serial number of the meter may be made before or after the indication thereof is recorded.

Figure 7:
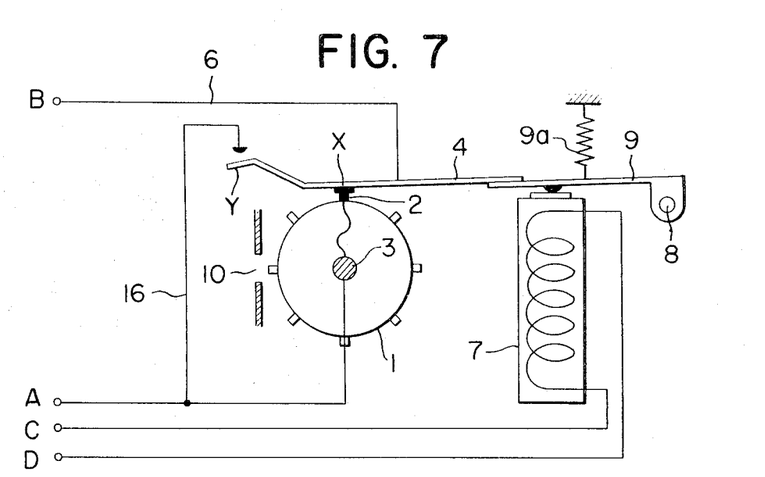
Figure 8:
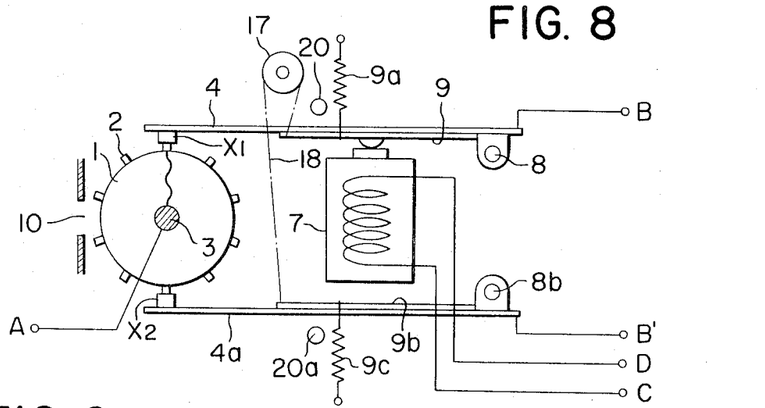
FIG. 8 is a diagrammatic side view of a fourth embodiment of the present invention.

Third Embodiment, FIGS. 7 and 8

The third embodiment is also capable of representing a serial number or the like of the meter without the provision of the switch 11 of the character described above.

The third embodiment is substantially similar to the first and second embodiments described hereinabove except that no stationary arm 5 is provided; the movable arms 4 are directly connected to the terminals through leads 6; and the selected movable arms 4 are normally connected to the terminal A through leads 16, so that the serial number of the meter may be represented in binary form.

When the current flows into the terminal A (See FIG. 7), the electrical signals in binary code representing the serial number of the meter are derived from the terminals B. Upon depression of the main switch of the data collector, the electromagnet 7 attracts the supporting member 9 so that the movable arms 4 move downwardly. In consequence, the contacts Y are disconnected from the leads 16 while the contacts X make contact with the pins 2 so that only the electrical signals representing in binary code the indication of the meter as indicated may be derived in the manner described hereinabove.

Fourth Embodiment, FIGS. 8 – 11

The important object of the fourth embodiment is to increase a number of binary digits without increasing the thickness of the digit wheel. It is also possible even to reduce the thickness of a digit wheel while the number of binary digits may be increased to provide, for example, parity check code.

In the fourth embodiment, two movable arms 4 and 4a having the contacts $X_1$ and $X_2$ are disposed in diametrically opposed relation with respect to the digit wheel 1 as shown in FIG. 8. The construction and arrangement of the movable arms 4 and 4a are similar to those of the first embodiment. The upper and lower movable arms 4 and 4a are electrically connected to the terminals B and B' respectively and mechanically interconnected with each other through a pulley 17 and rope 18. Both ends of the rope 18 are securely fixed to the movable arms 4 and 4a respectively so that when the electromagnet 7 attracts the upper movable arm 4, the lower movable arm 4a is also moved toward the digit wheel 1 through the pulley 17 and rope 18, whereby the contacts $X_1$ and $X_2$ make contact with the pins 2 upon the digit wheel 1. In consequence, the circuits between the terminals A and B and between the terminals A and B' are completed. The movable arms 4 which are normally biased upwardly and downwardly respectively by the springs 9a and 9c are stopped by the stoppers 20 and 20a.

Figure 9:
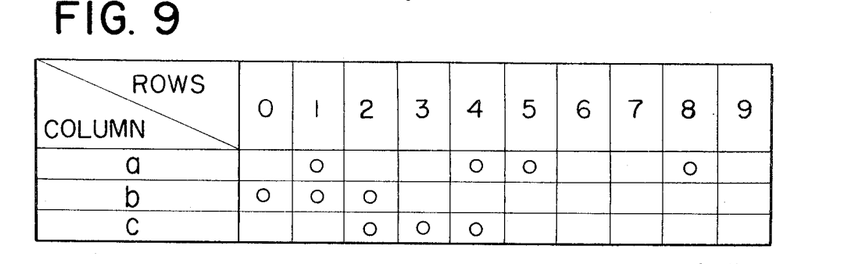
FIGS. 9 and 10 are for explanation of a binary code system used in this embodiment in order to represent in binary form the decimals positioned around the periphery of the digit wheel, a decimal digit being represented by a combination of a preselected pairs of angularly spaced apart rows as shown in FIG. 10.
Figure 10:
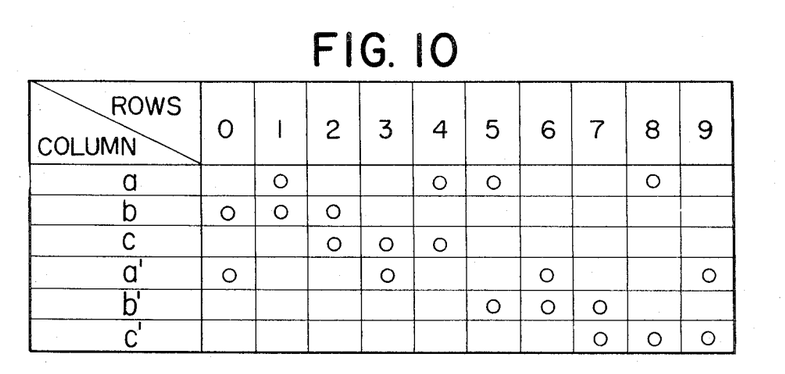

In this embodiment, it should be noted that the pins 2 are arrayed only in three columns, opposed to the four columns in the above described embodiments. For example, the pins 2 are arrayed in three columns a, b and c as shown in FIG. 9, so that the thickness of the digit wheel 1 may be reduced compared withe the digit wheel having the pins arrayed in four columns in the above described embodiments. However, it should be noted that the decimals from 0 to 9 are not represented by the binary code system shown in FIG. 9, but by the six binary digits as shown in FIG. 10 the white dots represent the pins. More specifically, a decimal is represented by a combination of two rows of pins 2 arranged as shown in FIG. 9 in diametrically opposed relation upon the circumference of the digit wheel 1.

Referring to FIG. 9, the rows 0 and 5; 1 and 6; 2 and 7; 3 and 8; and 4 and 9 are in diametrically opposed relation with each other upon the digit wheel 1. For example, when the pins 2 representing the row 0 in FIG. 9 are making contact with the upper contacts $X_1$, the pins representing the row 5 are making contact with the lower contacts $X_2$. It is therefore readily seen that in combination the pins 2 are present as shown in row 0 in FIG. 10. That is, the pins 2 are present in the columns b and a' in FIG. 10 so that the decimal zero may be represented in the binary coded form, that is 010100. Similarly when the pins 2 representing the row 1 in FIG. 9 are making contact with the upper contacts $X_1$, the pins 2 representing the row 6 in FIG. 9 would be making contact with the lower contacts $X_2$. However, there is no pin in the row 6 in FIG. 9 so that the pins 2 are present as shown in row 1 in FIG. 10. Thus, the decimal one may be represented as 110000. In a similar manner, the decimals from 2 to 9 may be represented in code form as shown in FIG. 10.

Figure 11:
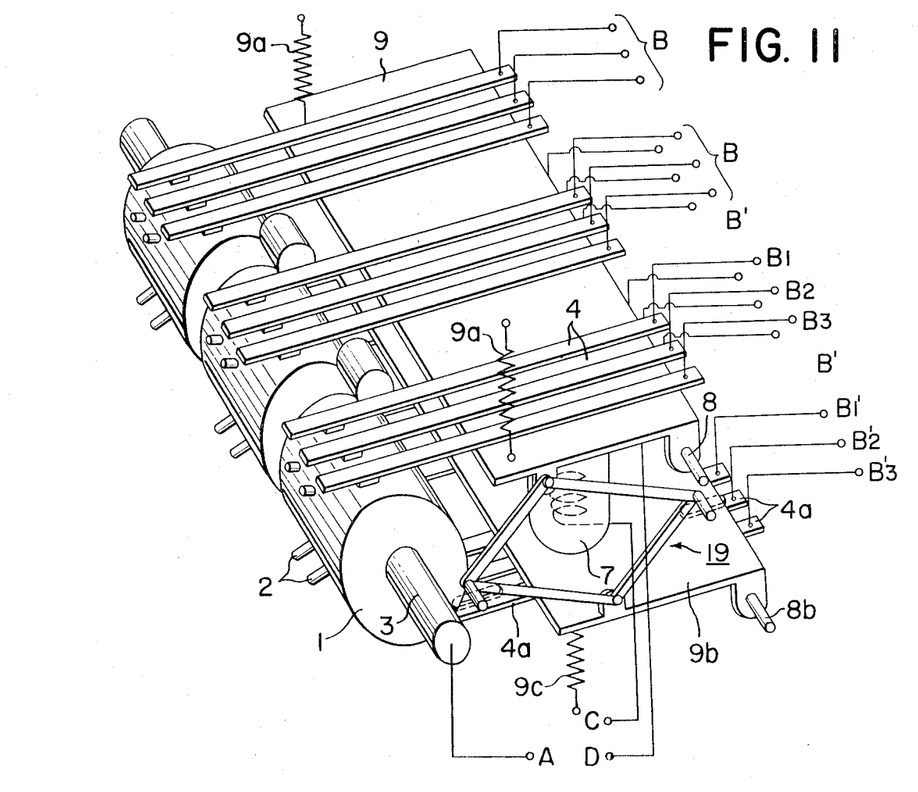
FIG. 11 is a perspective view of the fourth embodiment shown in FIG. 8 for generating the electrical signals representing an indication in three digits.

When the indication of the meter is in three decimal digit, three digit wheels 1 must be provided, so that 18 movable arms 4 in total are provided as shown in FIG. 11. In FIG. 11, a four-bar linkage 19 is used instead of the pulley and rope. Two diagonally opposed joints are securely fixed to the supporting members 9 respectively while another pair of diagonally opposed jpints are so arranged as to move in slits formed through the casing of the meter. Thus, it is readily seen that when the upper supporting member 9 is attracted toward the electromagnet 7 so as to move the upper movable arms 4 toward the digital wheels 1 the lower supporting member 9b is also moved toward the upper supporting member 9 so that the lower movable arms 4a may be moved toward the digital wheels 1.

The signals representing the presence of the pins 2 in the columns a, b, and c in FIG. 10 are derived from the terminals $B_1$, $B_2$ and $B_3$ respectively connected to the upper movable arms 4 while the signals representing the presence of the pins 2 in the columns a', b' and c' in FIG. 10 are derived from the terminals $B'_1$, $B'_2$ and $B'_3$ respectively connected to the lower movable arms 4a.

The mode of operation of the fourth embodiment is substantially similar to that of the above-described embodiments, but as has been discussed above, the reading of the meter is represented in a six digit binary code.

Figure 12:
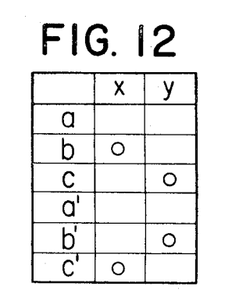
FIG. 12 is for explanation of the representation of the characters $x$ and $y$ in binary form.

In addition to the decimals 0 to 9, other characters or symbols such as x and y may be also represented in a binary code as shown in FIG. 12.

Figure 13:
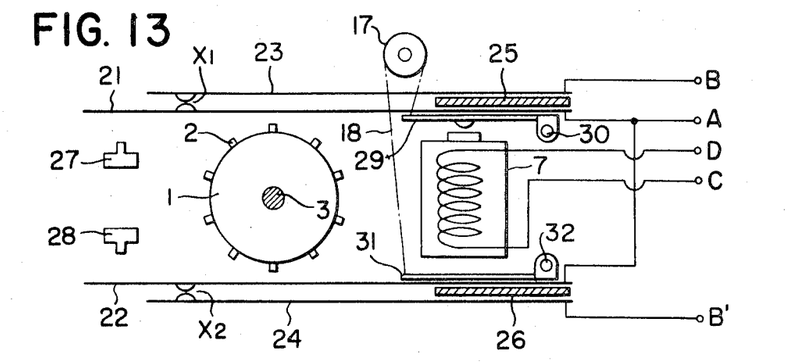
FIGS. 13, 14 and 15 are diagrammatic side views illustrating a fifth embodiment of the present invention.
Figure 14:
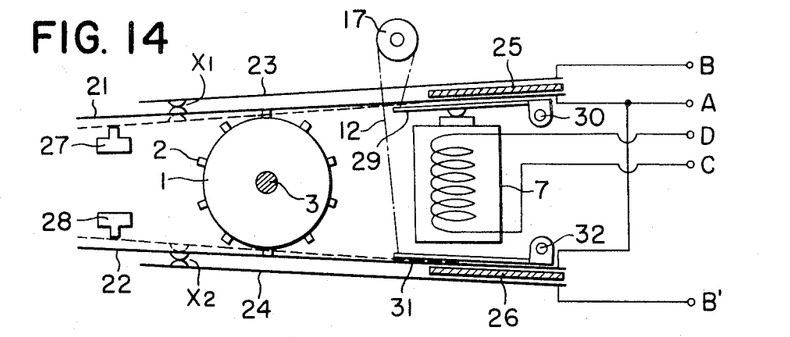
Figure 15:
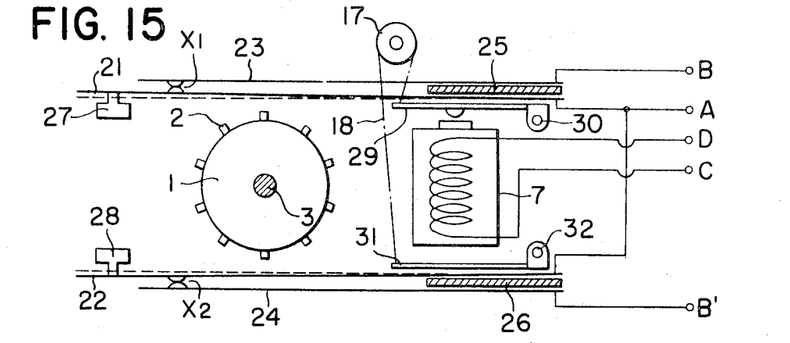

Fifth Embodiment, FIGS. 13, 14 and 15

The fifth embodiment is different from the above described embodiments mainly in that the pins 2 are not utilized as electric contacts. Two pairs of movable bars 21 and 23; and 22 and 24 having the contacts $X_1$ and $X_2$ are disposed in diametrically opposed relation with respect to the digit wheel 1 having the pins 2. Each pair of movable arms are electrically insulated by an insulator strip 25 or 26 and are normally spaced apart from each other as shown in FIG. 14 so that the contacts $X_1$ and $X_2$ make no contact. The movable arms 21 and 22 are electrically connected to the terminal A while the movable arms 23 and 24 are electrically connected to the terminals B and B' respectively. The two pairs of movable arms 21 and 23; 22 and 24 are securely fixed to the supporting members 29 and 31 respectively which, in turn, are pivotably fixed to a stationary member of the meter by pivots 30 and 32 as in the case of the first embodiment.

As in the case of the fourth embodiment, the upper and lower pairs of movable arms are interconnected through the pulley 11 and the rope 12 so that when the electromagnet 7 attracts the upper supporting member 29, the lower pair of movable arms 22 and 24 are moved toward the digit wheel 1 as shown in FIGS. 14 and 15. Actuating members 27 and 28, having pins representing the serial number of the meter in binary code, are vertically movably disposed below and above the movable arms 21 and 22 respectively. The function of these actuating members 27 and 28 will be described in more detail hereinafter.

The mode of operation of the fifth embodiment is as follows. When the meter or the like device is not connected to the data collector, the movable arms 21–24 are moved away from the digit wheel 1 so that it may freely rotate. When the data collector is connected to the meter and the main switch is depressed in a similar manner described hereinabove, the electromagnet 7 is energized, thereby attracting the upper supporting member 29 so that all of the movable arms 21–24 are caused to move toward the digit wheel 1. When there are pins 2 below and above the movable arms 21 and 22, the movement of the arms 21 and 22 are prevented as shown by the solid lines in FIG. 14 while the movable arms 23 and 24 continue to move, so that the contacts $X_1$ and $X_2$ are closed. In consequence the circuits between the terminals A and B and B' are completed so that the ON signals may be derived from the terminals B and B'. On the other hand, when there is no pin upon the digit wheel 1 when the movable arms 21–24 are moved toward it, the movable arms 21 and 22 may move to the positions indicated by the broken lines in FIG. 14 so that the movable arms 23 and 24 remain spaced apart from their mating movable arms 21 and 22, whereby the contacts $X_1$ and $X_2$ remain opened. In consequence the circuits between the terminals A and B and B' are interrupted so that the OFF signals are derived from the terminals B and B'. Thus, it is readily seen that the reading of the meter may be represented by the electrical signals in binary form as in the case of the above described embodiments.

The actuating members 27 and 28 are vertically movably disposed below and above the selected movable arms 21 and 22 so as to represent in binary code the serial number of the meter or the like device. To record the serial number, the actuating members 27 and 28 are vertically moved toward the movable arms 21 and 22 so as to move them toward their mating movable arms 23 and 24, thereby closing the contacts $X_1$ and $X_2$. Thus, the electrical signals representing in binary code the serial number or the like of the meter may be generated. This operation must be made when the electromagnet 7 remains de-energized. It will be understood that the actuating members 27 and 28 may be so arranged as to be automatically or manually moved toward the arms 21 and 22.

General Description of the Sixth, Seventh and Eighth Embodiments, FIGS. 16, 17, 18 and 19

In general in the first to sixth embodiments of the present invention described hereinabove, two electromagnets or one electromagnet and one motor are required for driving the movable arms carrying the electric contacts and the digit wheels so that the meters tend to become large in size and expensive to manufacture.

On the other hand known is a water meter with a remote control system for example as disclosed in the Japanese Utility Model Publication No. 1320/1968 comprising a pulse generating means for generating pulses a number of which is determined in response to a predetermined quantity or volume of water that passes through the water meter and an indicating means including an electric motor for driving digit wheels in a totalizer or integrating counter in response to a number of pulses generated by the pulse generating means and arrived at the motor.

In brief, the sixth, seventh and eighth embodiments of the present invention contemplate to overcome the problems described above of the first to fifth embodiments by combining the motor of the type described in connection with the water meter with the apparatus similar to the first to fifth embodiments, especially to the fifth embodiment.

For the sake of facilitating the understanding of the sixth, seventh and eighth embodiments to be described in detail hereinafter, the prior art water meter with a remote control system will be described in brief with reference to FIGS. 16 and 17.

Figure 16:
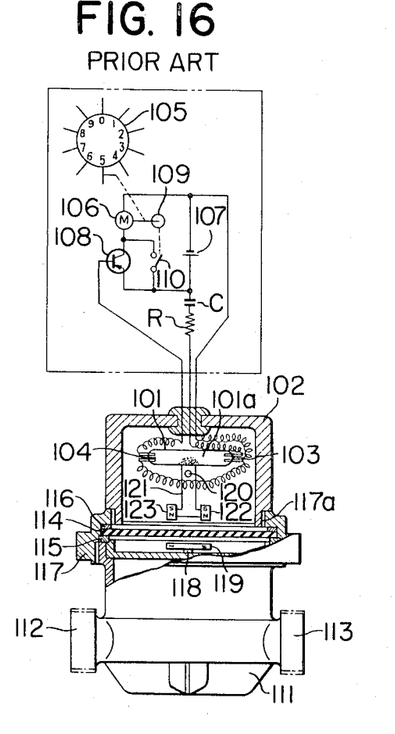
FIG. 16 is a diagrammatic view of the prior art water meter with a remote control system which is utilized in a sixth, seventh and eighth embodiments of the present invention.

Referring to FIG. 16, the prior art water meter to be utilized in the present invention is shown as comprising a pulse generator and indicator or counter section and a metering section. The pulse generator and indicator or counter section comprises a digit wheel 105, a motor 106, and electric source 107, a transistor 108, a cam 109, a switch 110 operatively and mechanically coupled to the cam 109 and electrically connected with the motor 106 in parallel with the transistor 108, a CR circuit consisting of a capacitor C and a resistor R, a mercury switch 101 having two electric contacts 103 and 104 and enclosing mercury 101a, the mercury switch 101 being carried at the upper end of a holder 121 pivoted at 120, a pair of spaced-apart permanent magnets 122 and 123 with the polarities as shown fixed to the lower end of the holder 121 and a permanent magnet 119 carried for rotation at the upper end of a shaft 118 drivingly coupled through a reduction gear train to a propeller or the like in a metering section for rotation in a predetermined proportion to a number of rotations of the propeller or the like. The holder 121 carrying the mercury switch 101 and the pair of permanent magnets 122 and 123 are housed in an upper casing 117 while the lower permanent magnet 119 carried for rotation by the shaft 118 in a lower casing 111 in opposed relation with the pair of upper permanent magnets 122 and 123 through a glass plate 114. The lower casing 111 having an inlet 112 and an outlet 113 also houses the propeller or the like and the reduction gear train (both of which are not shown) and is sealingly coupled to the upper casing 117 through packings 115 and 116 by screw thread engagement at 117a.

Next the mode of operation will be described in brief. When the N and S poles of the lower magnet 119 are positioned as viewed from FIG. 16, the N pole of the lower magnet 119 repels that of the upper magnet 123 while the S pole of the lower magnet 119 attracts the N pole of the upper magnet 122 so that the holder 121 is pivoted about its pivot 120 in the clockwise direction. Consequently the mercury switch 101 is inclined toward the right so that mercury 101a is moved also toward the right and closes the contact 103. A circuit consisting of this closed contact 103 the power source 107 and the CR time constant circuit is closed so that the capacitor C is charged to a voltage of the power source 107 through the resistor R.

When upon rotation of the propeller or the like the lower magnet 119 is rotated through an angle of 180° from the position indicated in FIG. 16 so that the positions of the N and S poles thereof are reversed, the holder 121 is rotated about its pivot 120 in the counter-clockwise direction this time by the repelling and attracting forces acting between the north and south poles of the upper and lower magnets. In consequence the mercury switch 101 is rotated in the counterclockwise direction so that mercury 101a is moved toward the left to thereby make the contact 104. Therefore the capacitor C is discharged through the base of the transistor 108 so that the latter is saturated. The collector current of the transistor 108 drives the motor 106 during a time interval determined by the time constant of the CR circuit.

The switch 110 to be actuated by the cam 109 drivingly coupled to the motor 106 is connected in parallel with the transistor 108 so that when upon rotation of the cam 109 the switch 110 is closed no base current due to the discharge of the capacitor C is supplied so that the transistor 108 is cut off. However the current is supplied from the power source 107 through the closed switch 110 so that the motor 106 is kept rotated or driven.

Figure 17:
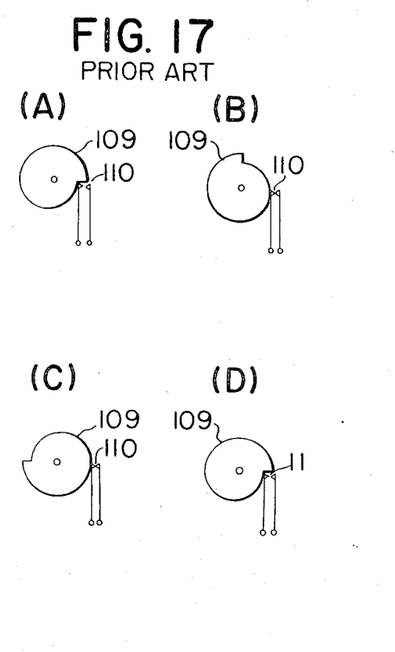
FIG. 17 is for explanation of the relation between a cam and a switch actuated by this cam of the water meter shown in FIG. 16.

The relation between the switch 110 and the cam 109 is illustrated in FIG. 17. FIG. 17A illustrates when the motor is de-energized; FIG. 17B when the switch 110 is closed while the motor 106 is driven by the collector current from the transistor 108; FIG. 17C when the motor continues its rotation as the switch 110 is closed; and 17D when the cam 109 has completed its one rotation so that the switch 110 is opened. It is noted that the when the cam 109 is positioned as indicated in FIGS. 17B and C, the motor 106 continues its rotation even when the transistor 108 is cut off. The digit wheel 105 is so drivingly coupled to the motor 106 as to rotate through a predetermined angle during one cycle of rotation of the cam 109 as viewed from FIG. 17A to D to thereby indicate a quantity or volume of water that passed through the water meter during the time the lower magnet 119 makes a rotation through an angle of 180°.

Figure 18:
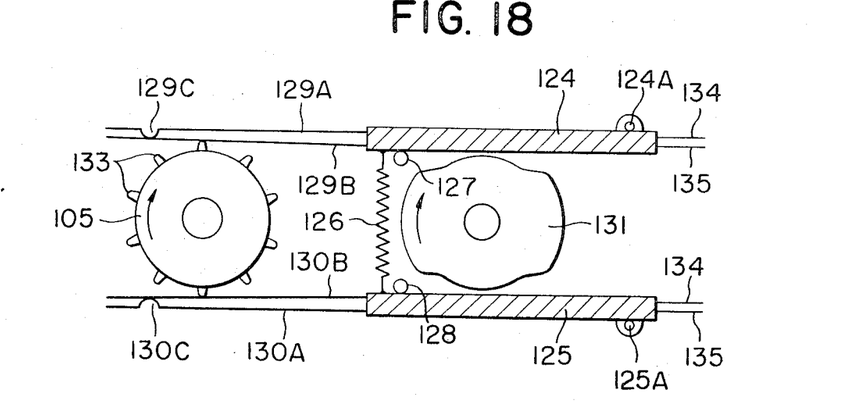
FIG. 18 and 19 are diagrammatic views for explanation of the underlying principle of the sixth embodiment of the present invention.
Figure 19:
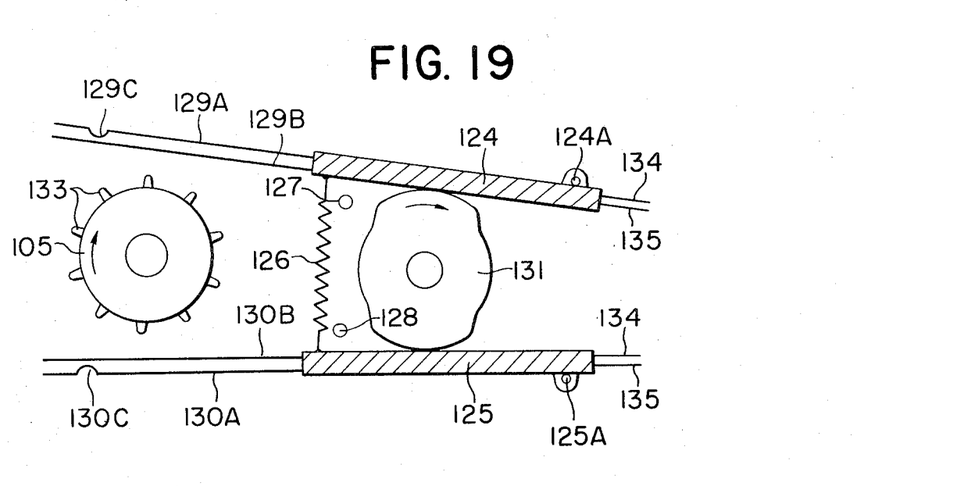
Figure 20:
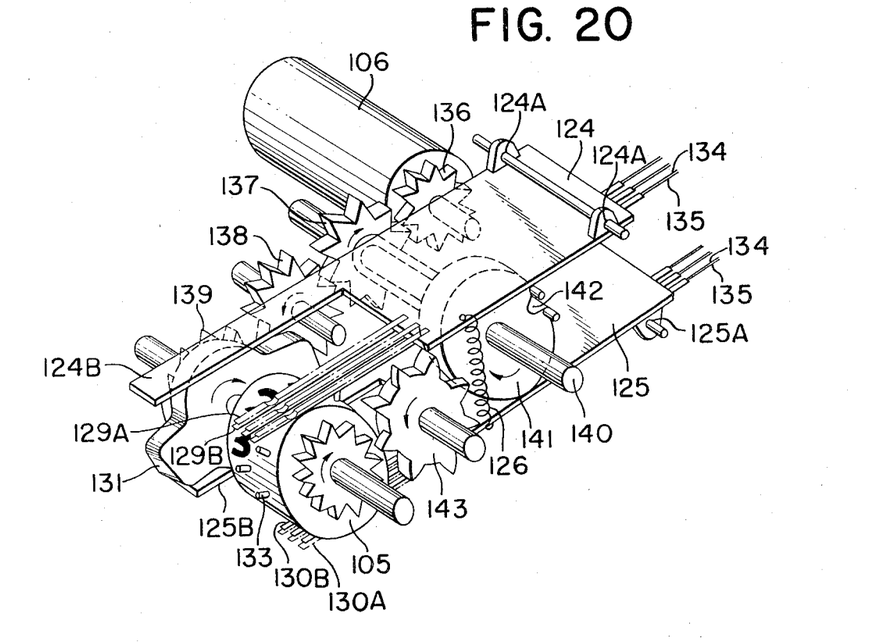
FIG. 20 is a perspective view thereof.

Sixth Embodiment, FIGS. 18, 19 and 20

Referring to FIG. 18, two movable arms 124 and 125 are pivoted at 124A and 125A respectively and normally biased so as to move toward each other by a tension spring 26 and stopped by stoppers 127 and 128 respectively. Two pairs of contact bars 129A and 129B; and 130A and 130B are extending from the arms 124 and 125 respectively and are provided with contacts 129C and 130C respectively.

Between the upper and lower arms 124 and 125 and the upper and lower contact bar pairs 129A and 129B and 130A and 130B are interposed a cam 131 and a digit wheel 105 respectively. When the low cam surface portions of the cam 131 are made in contact with the movable arms 124 and 125 as indicated in FIG. 18, the latter are made in contact with the stoppers 127 and 128 respectively under the force of the spring 126 while projected control elements 133, which will be referred to as "pins" hereinafter, extending from the digit wheel 105 cause the elastic contact bars 129B and 130B to move toward the contact bars 129A and 130A respectively so that the contacts 129C and 130C are closed. However, it should be noted that when there is no pin under or above the contact arms 129B and 130B, the contacts 129C and 130C are not closed. Thus the ON signal is obtained from a lead 134 when the contact 129C or 130C is closed while the OFF signal is derived when the contact 129C or 130C is not closed. Reference numeral 135 designate input lines.

On the other hand when the raised cam surface portions of the cam 131 are made in contact with the arms 124 and 125 as viewed from FIG. 19, the arms 124 and 125 are rotated about their pivots 124A and 125A respectively against the spring 126 so that the contact bars are spaced apart from the digit wheel 105. Thus, the contacts 129C and 130C are opened regardless of the presence or absence of the pins 133 below or above the elastic contact bars 129B and 130B and the digit wheel 105 may be rotated freely.

The apparatus of the sixth embodiment of the present invention illustrated in FIG. 20 is similar to FIG. 18. More specifically the low cam surfaces of the cam 131 is made in contact with the extensions 124B and 125B of the arms 124 and 125 respectively so that the pins 133 of the digit wheel 105 below and above the contact bars 129B and 130B cause them to move outwardly to thereby close the contacts 129C and 130C. Thus when the data recorder is connected to the meter, the ON and OFF signals are recorded depending upon the presence and absence of the pins 133 upon the digit wheel 105. The pins 133 on the digit wheel 105 are arranged in a similar manner as in the case of the fourth embodiment described above.

In this embodiment, it is assumed that the cam 131 is connected to the motor 106 described with reference with FIGS. 16 and 17 through a main gear 136, intermediate gears 137 and 138 and a gear 139 fixed to the cam 131. A counter wheel 141 carried by the shaft 140 of the intermediate gear 137 has only one recessed portion 142 which is adapted to rotate a toothed wheel 143 through an angle corresponding to two pitches when engaged therewith. The toothed wheel 143 in turn advances the digit wheel 105 by one step. In this case, the digit wheel 105 is free because upon rotation of the motor 106 the raised portions of the cam 131 are made in contact with the extensions 124B and 125B of the arms 124 and 125 so that the pairs of the contact bars 129A and 129B; and 130A and 130B are spaced apart from the pins 133 of the digit wheel 105. These mechanism for driving the digit wheel is of the type well known in the art.

When the digit wheel 105 is rotated by one step, the cam 131 is further rotated so that its lower surfaces are made in contact with the extensions 124B and 125B so that the contact bars are made in contact with the pins 133 of the digit wheel 105. In this case, an "end" pulse is generated so as to stop the motor 106. The number of the digit wheels 105 may be increased as many as desired.

When three digit wheels 105 are used, a signal representing a three digit may be derived as with the first to fifth embodiments described above.

Figure 21:
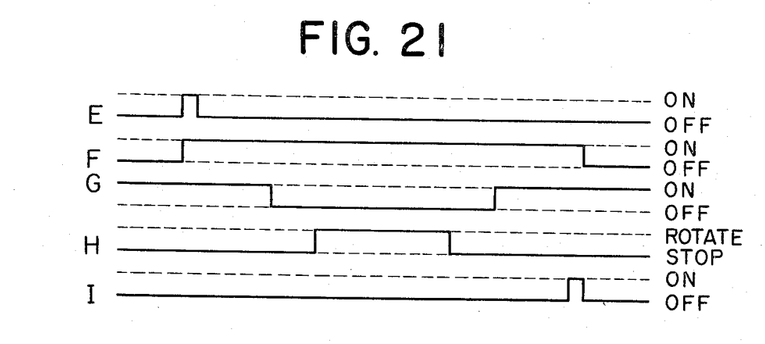
FIG. 21 is a time chart for explanation of the mode of operation thereof.

FIG. 21 is a time chart for explanation of the mode of operation of the sixth embodiment operatively coupled with the water meter of the type described with reference to FIGS. 16 and 17. The input pulse from the pulse generating section is indicated a E; the rotation of the motor at F; make and break of the contacts 129C and 130C at G; the rotation of the digit wheel at I: and the end pulse at I. Upon arrival of the input pulse (See E), the rotation of the motor is started (See F) so that the arms are moved away from the digit wheel by the cam to thereby permit the free rotation of the digit wheel (See H). Upon return of the arms to the initial positions in a manner described above by the cam, the contacts are closed again (See G) and the end pulse is generated (See I) and the motor is stopped (See F).

Figure 22:
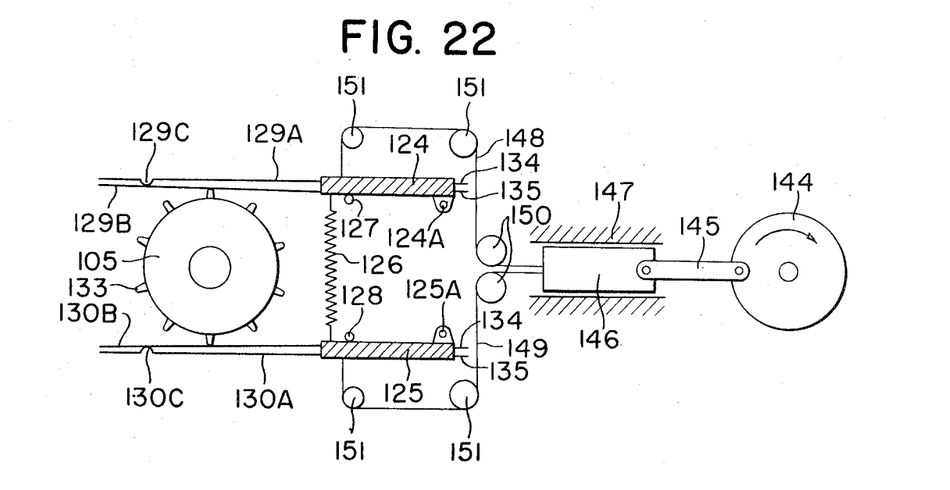
FIGS. 22 and 23 are diagrammatic views of the seventh embodiment of the present invention.
Figure 23:
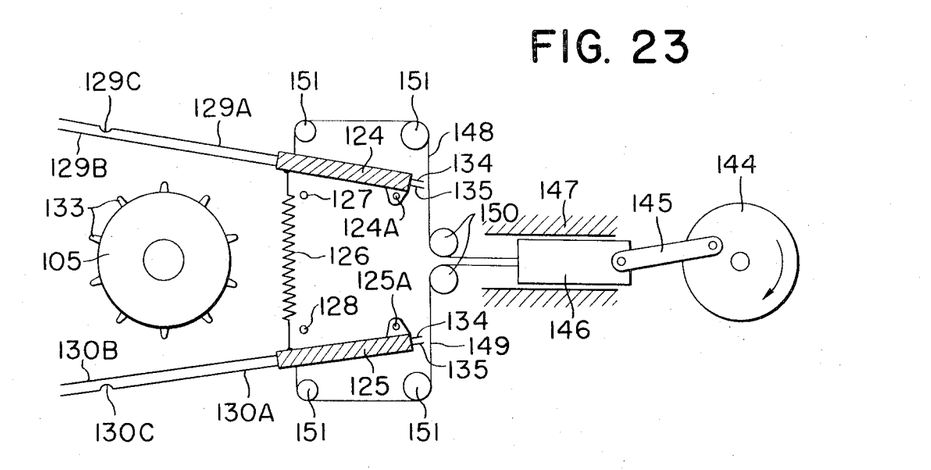

Seventh Embodiment, FIGS. 22 and 23

The seventh embodiment includes a slider and crank mechanism consisting of a wheel 144 which is operatively coupled to the motor 106 indicated in FIG. 16 and rotates in the direction indicated by the arrow, a connecting rod 145 one end of which is connected to the wheel 144 while the other end is connected to one end of a sliding arm 146 guided by a guide 147. Two wires 148 and 149 extending from the other end of the sliding arm 146 are fixed to the arms 124 and 125 respectively through pulleys 150 and 151. That is, the seventh embodiment is similar to the sixth embodiment except that the arms 124 and 125 are moved toward or away from the digit wheel 105 by the slider and crank mechanism and the wires 148 and 149 instead of the cam.

The seventh embodiment is assumed to be drivingly coupled to the motor 106 of the water meter of the type described with reference to FIGS. 16 and 17. Upon rotation of the motor 106, the wheel 144 rotates in the direction indicated by the arrow so that the sliding arm 146 is moved toward the right as viewed from FIG. 23. In consequence the arms 124 and 125 are rotated about the pivots 124A and 125A and spaced apart from the pins 33 of the digit wheel 105 to thereby permit the free rotation thereof. Other operations are substantially similar to those of the sixth embodiment described above so that no further description will be made.

Figure 24:
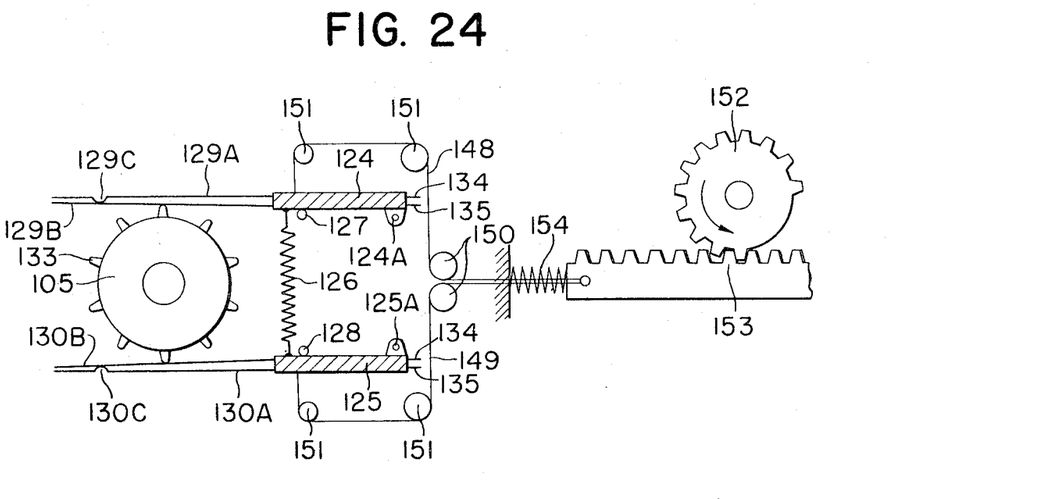
FIG. 24 is a diagrammatic view of the eighth embodiment of the present invention.

Eighth Embodiment, FIG. 24

In the eighth embodiment a rack and pinion mechanism is employed instead of the crank mechanism of the seventh embodiment. More specifically, a pinion 152 is drivingly coupled to the motor 106 and rotated in the direction indicated by the arrow (in the counterclockwise direction). It should be noted that as viewed from FIG. 24 the pinion 152 is not provided with any tooth along its outer peripheral portion substantially equal to one quater of the whole circumference thereof. A rack 153 in engagement with the pinion 152 is normally biased by a tension spring 154 toward the left and two wires 148 and 149 are fixed to one end of the rack 153.

Upon rotation of the pinion 152 the pinion is rotated in the direction indicated by the arrow so that the rack 153 is moved toward the right against the spring 154. In consequence the wires 148 and 149 are also pulled toward the right so that the arms 124 and 125 are moved away from the digit wheel 105 to thereby permit the free rotation thereof as in the case of the seventh embodiment. Upon rotation of the pinion 152 through an angle substantially equal to 270°, that is the three-quarter of one rotation, the non-toothed portion of the pinion 152 engages with the rack 153 so that the latter is released from the pinion 152 and is returned to its initial position under the force of the spring 154.

From the foregoing description, it is seen that the apparatus of the sixth, seventh and eighth embodiments of the present invention may be made compact in size at less costs because only one motor is utilized in order to rotate the digit wheels and to make and break the electric contacts of the detecting device.

Since the electric contacts are normally closed when the pins of the digit wheel are present above and below the contact arms, the indication of the meter may be derived at any time through for example the data collector. On the other hand when the digit wheels are being advanced, the contacts are opened, so that the operator will easily detect that the digit wheels are being advanced since no signal is derived even when the data collector is connected to the meter. In the prior art meter of the type described, the misreading of the indication of the meter tends to occur very often because the reading is often made while the digit wheels are being advanced. However, according to the present invention, especially to the sixth, seventh and eighth embodiments thereof, the mis-reading problem may be completely overcomed. In addition when the digit wheels must be advanced, their free rotation are ensured because the contact arms are moved away therefrom so that the digit wheels may be rotated by a less torque and a long service life of the contact may be ensured.

The present invention has been described so far with particular reference to the illustrative embodiments thereof, but it will be understood that variations and modifications can be effected without departing the spirit and scope of the present invention. For example, instead of the pins 2 the permanent magnets may be embedded in code form in the circumference of the digit wheel 1 while instead of movable arms 4, 21–24, reed switches may be utilized. In this case, the terminals A are directly coupled to these reed switches without bypassing the digit wheels 1. The movable bars 4, 21–24 made stationary while the electromagnet 7, the springs 13, and the stoppers 20 may be dispensed with. The apparatus may be made compact in size by this arrangement.

What is claimed is:

1. An apparatus for generating electrical signals in binary code representing an indication as indicated by digit wheels of a counter in a measuring instrument of the type for digitally expressing said indication, comprising:

coding means arrayed in axial rows and circumferential columns around the circumference of each digit wheel in the counter so that a combination of presence and absence of said coding means in each column in at least two preselected and circumferentially spaced apart rows of said coding means may represent in binary form a decimal digit positioned around the circumference of said each digit wheel, wherein said coding means comprises a plurality of pins extending from the circumference of said each digit wheel, each of said pins serving as one of a pair of electric contacts which is electrically connected to a common terminal, and detecting and signal generating means adapted to detect the presence and absence of said coding means in said at least two preselected and circumferentially spaced apart rows simultaneously on each of said digit wheels, thereby generating electrical signals representing in binary code said detected presence and absence of said coding means, wherein said detecting and signal generating means comprises a plurality of pairs of movable arms, each pair comprising two arms disposed on opposite sides of a digit wheel from each other, the number of pairs of arms being equal to the number of said columns of said pins, each pair of movable arms being electrically spaced apart from each other and constituting a pair of normally open electric contacts one of which is connected to a common terminal while the other is connected to an individual terminal, cam means energizable to cause the two arms of each of said plurality of pairs of movable arms to move toward each other and toward said digit wheels upon energization of the cam means for selectively closing said normally open electric contacts depending upon the presence and absence of said pins on said digit wheels in said indicating position, whereby electrical signals representing in binary code said indication may be derived from said individual terminals.

2. An apparatus as in claim 1 wherein said coding means represent a 2-out-of-6 code for each row, and said electrical signals are in a 2-out-of-6 binary code including parity check bits, each row representing one decimal digit.

3. An apparatus as in claim 1 wherein the two circumferentially spaced-apart rows are approximately 180° apart.

4. An apparatus for generating electrical signals in binary code representing an indication as indicated by digit wheels of a counter in a measuring instrument of the type for digitally expressing said indication, said apparatus being for use with a flowmeter of the type in which a quantity of fluid passed through said flowmeter may be transduced into a rotation through a predetermined angle of an electric motor for advancing said counter, said apparatus comprising:

coding means arrayed in axial rows and circumferential columns around the circumference of each digit wheel in the counter so that a combination of presence and absence of said coding means in each column in at least two preselected and circumferentially spaced apart rows of said coding means may represent in binary form a decimal digit positioned around the circumference of said each digit wheel, wherein said coding means comprises a plurality of pins extending from the circumference of each of said digit wheels; and detecting and signal generating means adapted to detect the presence and absence of said coding means in said at least two preselected and circumferentially spaced apart rows simultaneously on each of said digit wheels, thereby generating electrical signals representing in binary code said detected presence and absence of said coding means, wherein said detecting and signal generating means comprises a pair of upper and lower spaced-apart movable arms pivoted at one end thereof, a plurality of pairs of contact bars extending from the other end of each of said upper and lower movable arms, the number of said plurality of pairs of contact bars corresponding to the summation of the number of said columns of said pins of each of said digit wheels, at least one contact bar of each pair of said contact bars being made of an elastic material, and each of said pairs of contact bars constituting a normally open electric contact, a spring for normally biasing said movable arms of said pair of upper and lower movable arms toward each other to move said plurality of contact bars toward said digit wheels for closing each of said electric contacts when said pin is present above or below said each of said at least one elastic contact bars as said pin makes each of said at least one elastic contacts to contact with the other contact bar, a cam interposed between said pair of movable arms and drivingly coupled to said motor, said cam having a pair of raised cam surfaces formed in diametrically opposed relation with each other for contacting with said upper and lower movable arms upon rotation of said motor to move said pair of upper and lower movable arms away from each other against said spring whereby said pairs of contact bars are also spaced apart from said digit wheels to thereby open said electric contacts, and a pair of lead wires electrically connected to each of said electric contacts for connection with exterior electric or electronical equipment or the like for delivery thereto of a signal representing the open and closed state of each of said electric contacts.

* * * * *